W. G. LAIRD & G. R. SHIELDS.
GAS BENCH.
APPLICATION FILED NOV. 23, 1914.
1,147,103.
Patented July 20, 1915.
3 SHEETS—SHEET 1.
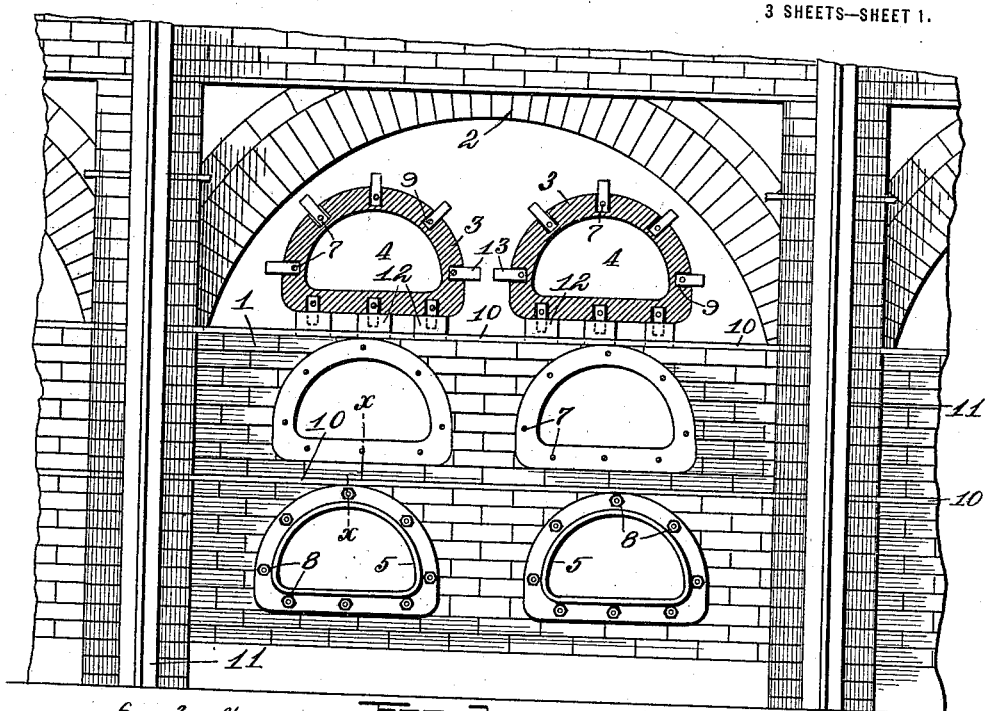
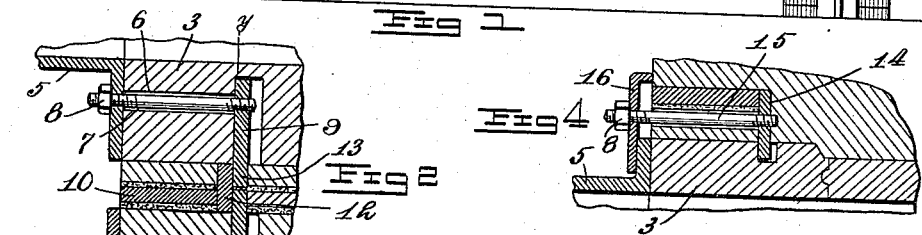
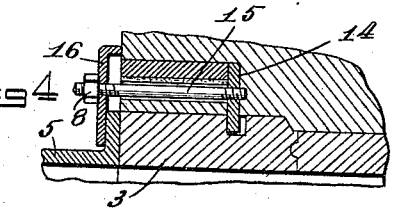
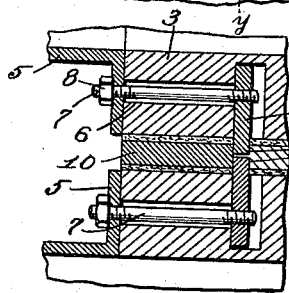
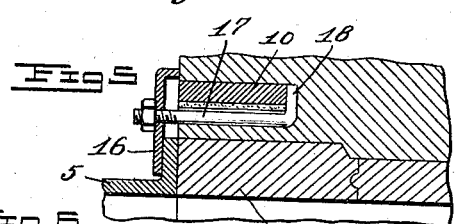
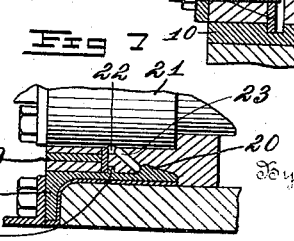
Witnesses
H. C. Robinette
George McDaniel
Inventors
Wilbur G. Laird
George R. Shields
by K. P. McElroy
Attorney
COLUMBIA PLANOGRAPH CO., WASHINGTON, D. C.

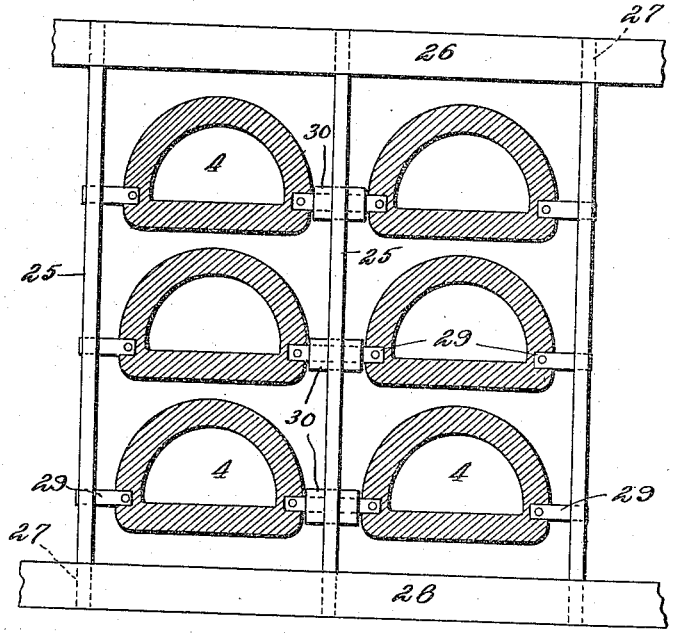

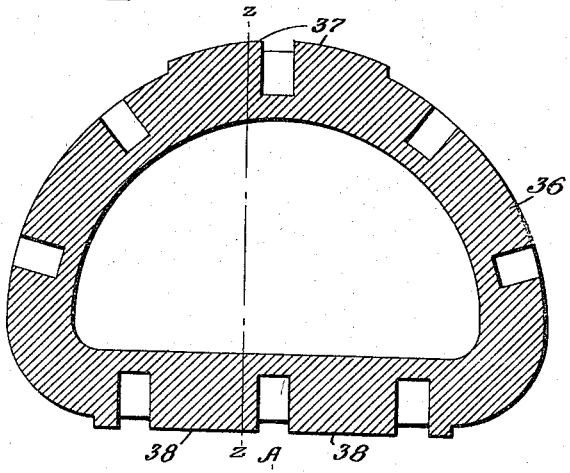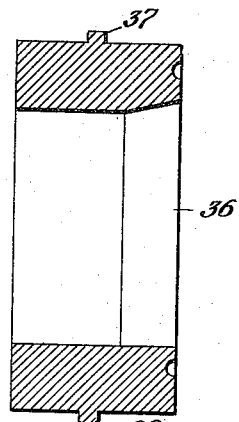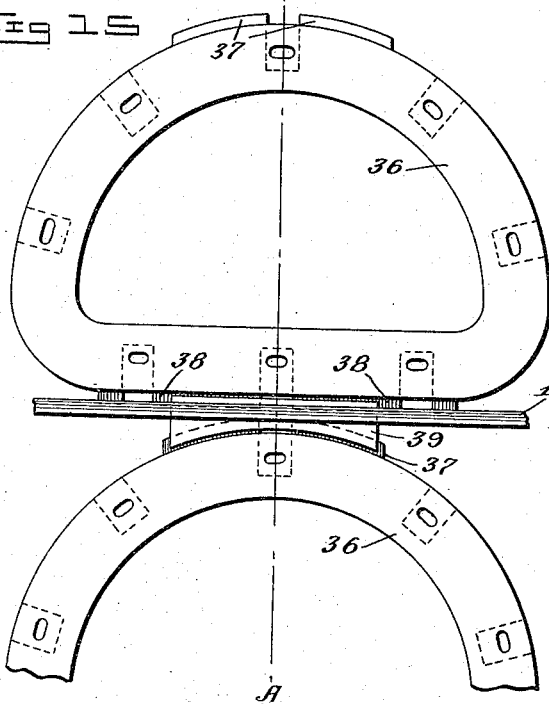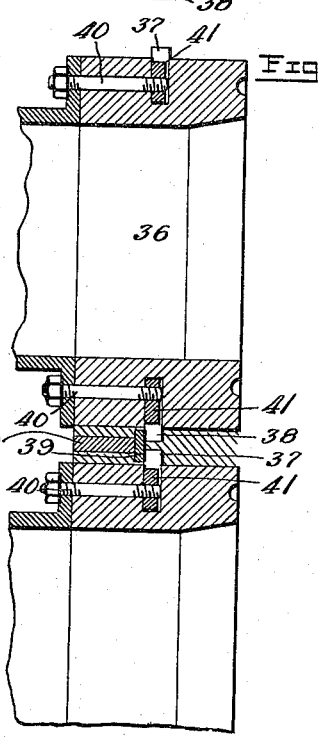

UNITED STATES PATENT OFFICE.

WILBUR G. LAIRD, OF NEW YORK, N. Y., AND GEORGE R. SHIELDS, OF DETROIT, MICHIGAN, ASSIGNORS TO THE IMPROVED EQUIPMENT COMPANY, OF NEW YORK, N. Y., A CORPORATION OF COLORADO.

GAS-BENCH.

1,147,103.  Specification of Letters Patent.  Patented July 20, 1915.

Application filed November 23, 1914. Serial No. 873,608.

*To all whom it may concern:*

Be it known that we, WILBUR G. LAIRD and GEORGE R. SHIELDS, citizens of the United States, residing, respectively, at New York, in the county and State of New York, and Detroit, in the county of Wayne and State of Michigan, have invented certain new and useful Improvements in Gas-Benches, of which the following is a specification.

This invention relates to gas benches; and it comprises a gas bench of masonry or the like, carrying one or more gas retorts and provided with retaining bars of steel, iron or other metal crossing the front of the gas bench, such bars advantageously having their forward face flush with the outer face of the brickwork, said bars being maintained in place by buckbars or equivalent elements along the face of the bench and said retorts being provided with end elements carrying a plurality of laterally projecting lugs, certain of said lugs being in engagement, direct or indirect, with the rear face of said retaining bars and certain others being in engagement with the masonry, the lug-forming elements also advantageously serving as anchor elements for bolts supporting the door frames or mouthpieces on said retorts; all as more fully hereinafter set forth and as claimed.

In building gas benches for the manufacture of illuminating gas from coal, and particularly where composite built-up retorts of silica or silicious material are employed, it is the custom to use a clay extension or end section for each retort, carrying a mouthpiece for such retort. Where the retort is integral and no extension is used the mouthpiece is secured directly to the end of the retort itself. These mouthpieces are of iron and are quite heavy, so that they exercise a great strain on the retort to which they are necessarily fastened with a tight joint. The weight of the mouthpiece being beyond the front wall it exercises a tilting strain on the retort. Ordinarily, the mouthpiece is bolted to the end of the retort or to the extension by bolts passing inwardly through longitudinal orifices to a lateral recess in which is a retaining element engaging the bolt end. Sometimes the end of the retort carries a special collar supporting the mouthpiece.

Aside from the strain on the retort caused by the mouthpiece, in the operation of a gas bench the front walls, and in the case of through retorts, both the front and back walls, are exposed to considerable strains; and particularly so since there is a great difference in temperature between the inner and outer faces of such a wall. Further, the retorts tend to lengthen or shorten more or less with changes in temperature. And a wall having retorts passing through it is not a strong wall. It is difficult to provide a structure in which the masonry of the front wall of the gas bench is permanent and of long life.

It is an object of the present invention to strengthen the wall and provide simple and effective means for locking the ends or mouthpieces of the retorts with such wall, making a stronger structure of the whole. In so locking the end elements locking is above as well as below the retort thereby obviating the tilting strain of the mouthpiece on the retort.

In the present invention we have therefore rearranged the structure of the front of the gas bench in such a manner as to provide the end elements of the retort with anchor elements. Some of these anchor elements may be utilized for direct engagement with the masonry. In addition, the wall is provided with certain retaining bars or members supporting, and supported by, the wall and engaging directly or indirectly with these anchor elements. These bars may be horizontal, or vertical or at any desired angle; but are hereinafter described as horizontal. While the bars may be of another section, they are advantageously flat. These bars are advantageously built in with the masonry so that their outer face is flush therewith and as the brickwork lying against their upper and lower faces prevents deformation they have a high degree of rigidity for a comparatively light weight of metal. They are held in position against forward displacement by suitable engagement with the vertical buckbars on the face of the gas bench, passing behind them, for example.

These retaining bars, through the anchor elements, take the forward thrust of the retorts and also serve to resist the tilting and twisting stresses given by the weight of the mouthpieces.

In providing the anchor elements for the retort, we may mold or otherwise provide it with the usual longitudinal orifices or bolt holes in the end, or in the end element where this is separate from the retort proper, these bolt holes serving for the bolts retaining the mouthpiece. At the rear end of the bolt holes there may be lateral recesses to permit the insertion of a threaded metal retaining member engaging the end of the bolt. To this threaded retaining member we give another function as well by extending it outward well beyond the recess to form a projecting anchor lug. Around the circumference of the retort we may locate a plurality of such lugs, say 8 to 10, distributed at intervals. The lugs at the top and at the bottom engage, directly or indirectly, the rear faces of the horizontal bars above and below, and are held in position against any forward movement of, or tilting stress upon, the retort. The other lugs, those on the sides of the retort, may enter and engage the masonry of the front wall of the gas bench, thereby locking retort and brickwork together. It will be seen this method of construction gives a simple, rigid and permanent bond between the front end of the retort and the front wall of the gas bench. The buckbars hold the retaining bars in place and these in turn hold the retorts in place through the stated anchor lugs. A locking engagement between the retaining bars and the retorts may however be given in other ways as by providing collars carrying special lugs or flanges; recessing the ends to carry a bar-engaging element, etc. Any way of engagement between the rear faces of the horizontal retaining bars and the retort ends may be used which will enable the push of the retorts to be resisted by such bars.

In the accompanying illustration there is shown, more or less diagrammatically, an embodiment of the stated invention. While a retort bench having two vertical series of retorts is shown, the invention may obviously be applied to benches carrying any number of retorts or series of retorts. In this showing—

Figure 1 is a fragmentary view, partly in vertical section (along $y$—$y$, Fig. 2) and partly in elevation, of a gas bench utilizing this invention; Fig. 2 is a fragmentary vertical longitudinal section taken along line $x$—$x$ of Fig. 1; Fig. 3 is a similar view of a slightly modified form; Fig. 4 is a similar view showing another modified form; Fig. 5 is a similar view of another form taking all the stress off the retort; Fig. 6 is a similar view using a notched or orificed retaining bar; Fig. 7 is a fragmentary view of an advantageous form of retort collar modified to enable its use with the retaining bars; Fig. 8 is a view showing a modified structure with vertical retaining bars; Fig. 9 is a central fragmental section of the same; Fig. 10 is a detail showing a T-bar used in the structure of Fig. 1; Fig. 11 is a similar view showing a U-bar; Fig. 12 is a similar view showing an L-bar; Fig. 13 is a view in section of a retort end or extension carrying special integral bar-engaging lugs or flanges; Fig. 14 is a section of the same along line $z$—$z$; Fig. 15 is a fragmentary view showing the engagement of a horizontal retaining bar by two retorts such as those shown in Fig. 13; and Fig. 16 is a fragmental sectional view of Fig. 15 along line A—A.

In the showing of Fig. 1 the bench is provided with the usual front wall 1 and arch 2. The ends 3 of retorts 4 are provided with the usual mouthpieces 5 and are provided with bolt holes 6. Through these bolt holes pass bolts 7 (see Fig. 2) provided at their front with nuts 8, and at their rear end being in threaded engagement with lug members 9 placed at intervals around the circumference of the retort, from which these lug members project some distance. Laid in the brickwork in the face of the front wall of the bench are flat horizontal retaining bars of steel, iron or any suitable metal 10 above and below the retorts, which at their ends pass behind vertical buckbars 11 by which they are retained in place against any forward thrust. As shown, each of these retaining members is a flat bar (although it may be of other section) which may be the width of a brick (see Fig. 2) and may have the thickness of a brick (see Fig. 3) or may not (as in Fig. 2). Usually and advantageously it may be quite thin, say inch or three-quarter inch steel or the thickness of a mortar joint. Behind it emerge the upper and lower anchor lugs of two superimposed retorts. As shown in Fig. 2, these flanges are located some distance behind and away from the comparatively thin flat horizontal retaining member and a vertical metal shim or other member 12 is used to engage the two flanges, this in turn being held in position by the horizontal retaining member. As shown in Fig. 3, the horizontal retaining member is sufficiently thick and is so located as to engage directly both the upper and lower anchor flanges. The lateral flanges 13 of the retort end are simply built into the brickwork.

In the modification of Fig. 4, instead of orificing the retort end to receive bolts for the mouthpiece, it is simply notched to receive the end of a short anchor bar 14. This anchor bar passes behind the retaining bar or may be integral therewith as in using an L-shape. Through the bar passes bolt 15 to engage bracket 16 holding the door frame or mouthpiece in place.

In Fig. 5 is a modified structure to avoid notching the retort end. Bolt 17 has a right angled extension 18 passing behind the retaining bar.

In Fig. 6, the structure is like that of Fig. 2 or Fig. 3 but the anchor element instead of passing behind the retaining bar enters a notch in it. This restrains movement of the mouthpiece in either direction.

In Fig. 7, is shown a modification of a retort collar to enable an engagement with the retaining bar. This collar, as shown, is of an advantageous type enabling mutual engagement of adjacent retorts. Collar 19 of a lower retort bears lug 20, while collar 21 of an upper retort bears lug 22. Pin or post 23 extends between and engages both. As shown, 22 also engages a shim or bar back of the flat retaining bar. Another lug 24 on the top of the collar of the lower retort also bears against the shim or bar.

In the structure of Figs. 8 and 9, the retaining bars in lieu of being horizontal are vertical. The vertical retaining bars 25 are held at their upper end by lintel or cross bar 26 to which they may be secured by brackets 27. At their base they may be similarly secured to cross bars 28. Beyond these vertical bars extend lugs 29 in the manner indicated in Fig. 1, elements 30 being shims or the like.

In Fig. 10 instead of using a flat retaining bar in the brickwork, a T-bar 31 may be employed. On the flange of this T-bar the mouthpiece of the retort may rest. Beyond it is shim 32. In Fig. 11 a U-bar 33 is employed. In Fig. 12, L-bar 34 is used. Behind it may be a shim 35 to enable engagement with the lugs of the upper and lower retorts.

In the structures of Figs. 13 to 16, inclusive, the thrust of the retort is taken by a molded integral flange or lug element on the end or end-section of the retort. The retort element 36, which may be of clay, is provided with molded lugs 37 on its top and similar molded lugs 38 on its bottom. These lugs engage the rear of a cross bar (10) between two retorts, as shown in Figs. 15 and 16. A shim 39 may be provided for giving a better bearing surface. The usual bolts 40 for holding the mouthpiece in place in these views are fastened by a special anchor element 41 which enters through a recess in the side of the retort element behind the lugs 38. The retaining bars in addition to their retort-locking function also play an important part in strengthening the front wall of the bench. As stated, though they are, or may be, of quite thin metal yet because of their location in the brickwork they present relatively great rigidity and oppose lateral displacement of the wall. The tensile strength of the metal resists vertical displacement and the bars distribute local stresses. All these functions are highly important in, and add materially to the life of, a gas bench.

While the described retaining bars and co-operating anchor elements have only been illustrated as used in the front wall of a gas bench, it is obvious that they may also be used with equal advantage in the rear wall of a bench of through retorts.

What we claim is:—

1. In a gas bench, a front wall, a pair of buckbars, horizontal metal retaining bars in said wall secured by said buckbars, a plurality of retorts in said bench and means to lock the ends of said retorts by said bars.

2. In a gas bench, a front wall, horizontal metal retaining bars in said wall, a plurality of retorts in said bench and means to lock the ends of said retorts by said bars.

3. In a gas bench, a front wall, a pair of transverse bars, metal retaining bars in said wall and secured by said transverse bars, a plurality of retorts in said bench and means including projecting lug members to lock the ends of said retorts by said retaining bars.

4. In a gas bench having a masonry wall and retorts passing through said wall, a metal bar laid in said wall, means for securing said bar in place and means for locking the ends of said retorts by said bar.

5. In a gas bench having a front wall, a pair of vertical buckbars, and a plurality of retorts, a horizontal retaining bar in said wall extending behind said buckbars, projecting lug means attached to said retorts located behind the rear face of said bar and means for causing engagement between said lug means and said rear face.

6. A gas bench having a horizontal retaining bar in the front wall, a retort in said bench and means conveying the forward thrust of said retort to said bar.

7. In a gas bench provided with vertical buckbars, a horizontal bar extending behind a pair of such buckbars, a retort carrying a mouthpiece secured by bolt-pins, the bolt-pins extending backwardly through orifices in the front of the retort, and anchor elements engaging the ends of said pins and extending laterally beyond the periphery of said extension, certain of said anchors passing behind said bar.

8. In a gas bench having a front wall, a pair of buckbars, and a pair of superimposed retorts, a horizontal retaining bar in said wall located between said retorts and extending behind said buckbars and means conveying any forward thrust of said retorts to the rear face of said retaining bar.

9. A gas bench having a wall provided with vertical buckbars, a pair of horizontal bars in said wall and flush with its front face passing behind a pair of such buckbars, a retort in said bench, a door frame on said retort and secured thereto by bolt-pins rearwardly extending therethrough and a plurality of anchor elements engaging the ends of said bolt-pins and extending laterally beyond the periphery of the retort, upper and lower anchor elements passing behind said horizontal bars and lateral anchor elements engaging wall elements.

10. In a gas bench having a wall, a flat narrow horizontal metal bar built in said wall, a retort carrying a mouthpiece in said bench, and isolated metal anchor elements extending outward from said retort behind said bar.

11. A retort having an end provided with rearwardly extending orifices and communicating lateral orifices, a bolt-pin in each such rearwardly extending orifice and a metal element thread-engaging such bolt-pin and extending through the lateral orifice a substantial distance beyond the surface of the retort to form an anchor lug.

12. In a gas bench, a metal bar built in a wall, a retort in said bench, a mouthpiece located at the end of said retort and means for anchoring said mouthpiece by said bar.

In testimony whereof, we affix our signatures in the presence of two subscribing witnesses.

WILBUR G. LAIRD.
GEORGE R. SHIELDS.

Witnesses for Laird:
ETHEL MACCANNON,
GLENN H. NILES.

Witnesses for Shields:
MARGARET GEORGE,
WILLIAM E. DYER.

Copies of this patent may be obtained for five cents each, by addressing the "Commissioner of Patents, Washington, D. C."